United States Patent
Jang

[11] Patent Number: 5,833,162
[45] Date of Patent: Nov. 10, 1998

[54] REEL TABLE DRIVING DEVICE FOR A VIDEO CASSETTE RECORDER

[75] Inventor: Ho-Jin Jang, Seoul, Rep. of Korea

[73] Assignee: Daewoo Electronics Co., Ltd., Seoul, Rep. of Korea

[21] Appl. No.: 886,230

[22] Filed: Jul. 1, 1997

Related U.S. Application Data

[63] Continuation-in-part of Ser. No. 360,866, Dec. 21, 1994.

[51] Int. Cl.$^6$ .................................................. G11B 15/32
[52] U.S. Cl. ....................................... 242/356.3; 360/96.3
[58] Field of Search .............................. 242/356.3, 356.4; 360/96.3

[56] References Cited

U.S. PATENT DOCUMENTS 4,681,281  7/1987  Aarts .................................. 360/96.3 X

*Primary Examiner*—John Q. Nguyen
*Attorney, Agent, or Firm*—Anderson, Kill & Olick, P.C.

[57] ABSTRACT

A video cassette recorder incorporates therein a reel table driving device. The reel table driving device comprises a pulley attached to a shaft rotatably held in the deck and a driving gear slidably mounted to the shaft. The driving gear is provided with a first and a second gear portions, the first gear portion having a smaller diameter than the second gear portion. A pair of idlers is rotatably held in a support plate. Each of the idlers includes a first gear and a second gear, the first gear having a larger diameter than the second gear. A compressive spring is disposed between a bottom plate and the pulley, biasing the driving gear upwardly so that the first gear portion of the driving gear is engaged with the first gears of the idlers. An urging member is pivotably mounted at one end to the deck and the other end is situated on a bottom plate of the driving gear. A movable lever with a protuberance is disposed above the urging member and is moved in the lengthwise direction depending on the operation mode of the VCR. The protuberance of the movable lever selectively presses the urging portion and the driving gear down so that the second gear portion is engaged with the second gears of the idlers.

3 Claims, 5 Drawing Sheets

REEL TABLE DRIVING DEVICE FOR A VIDEO CASSETTE RECORDER

CROSS REFERENCE TO RELATED APPLICATION

This application is a continuation-in-part of application Ser. No. 08/360,866, filed on Dec. 21, 1994.

FIELD OF THE INVENTION

The present invention relates to a reel table driving mechanism; and, more particularly, to a device for driving reel table of a video cassette recorder ("VCR"), capable of preventing slackness of a magnetic tape loaded in the VCR during a change in its operating mode and providing a variable torque to one of the reel tables through an idler thereof for a selected mode.

DESCRIPTION OF THE PRIOR ART

As is well known, a VCR is operable in various modes, e.g., play, review, rewind and fast forward modes, through the selective operation of the driving mechanism thereof. Usually, the switching of the operating mode is executed by the selective drive of a supply reel table and a take-up reel table of the VCR. Typically, such a driving mechanism includes an idler positioned between the supply reel table and the take-up reel table, which is shifted clockwise and counterclockwise to transmit selectively its driving force to one of the reel tables, thereby enabling the VCR to operate in a certain selected mode. However, looseness of a loaded magnetic tape in the VCR may occur during the conversion to a desired mode of operation due to a delay in the shifting motion of the idler and the inertia moment of the reel tables, which may cause operational failures, noises and/or distortions.

A prior art reel table driving apparatus of VCR is schematically shown in FIGS. 1 and 2. The VCR shown therein includes a supply reel table 10 and a take-up reel table 12 rotatably mounted to a deck (not shown). Further, the VCR is provided with a reel table driving mechanism 14 disposed between the supply reel table 10 and the take-up reel table 12, which drives selectively one of the reel tables 10, 12 during the operation of the VCR in a selected mode. Typically, the reel table driving mechanism 14 includes a pulley 16 fixed to a shaft 18, a driving gear 20 secured to the shaft 18, a bracket 22 for rotatably supporting the shaft 18, means for driving the pulley 16, an idle gear 24 rotatably supported at the bracket 22 and meshed with the driving gear 24, and a gear train G disposed between the supply reel table 10 and the driving gear 20 to transmit the driving force of the driving gear 20 to the supply reel table 10 therethrough. The driving means has a driving pulley 26 fixed to a capstan shaft 28, and a belt 30 for interlinking the pulley 16, 26. As shown in FIGS. 1 and 2, the gear train G consists of a plurality of transferring gears which are designed to allow the supply reel table 10 to rotate in a relative high speed therethrough.

According to the typical driving mechanism, e.g., in case of the rewinding mode operation, the counterclockwise rotation of the pulley 16 causes the idle gear 24 to be shifted toward and engaged with the gear train G, rotating the supply reel table 10. Likewise, in order to operate the VCR in the play mode, the pulley 16 is rotated clockwise. At this time, the idle gear 24 is shifted toward and directly engaged with the take-up reel table 12, thereby transmitting the rotating force of the driving gear 20 to the take-up reel table 12.

However, in the prior art reel table driving mechanism as discussed above, there may occur a tape slackness during the shifting of the idle gear 24 toward one of the reel tables 10, 20 as the shifting motion of the idle gear 24 may be delayed due to its extended traveling distance. Further, the combination of the gear train with the driving mechanism entails a more complicated structure of the VCR.

SUMMARY OF THE INVENTION

It is, therefore, a primary object of the invention to provide a reel table driving device for use in a VCR, which is capable of preventing a loaded magnetic rape from slackening during the shifting of an operating mode by way of minimizing the travelling distance of an idle gear thereof.

It is another object of the present invention to provide a reel table driving mechanism with a pair of idlers which are designed to impart a variable torque to one of the reel tables in the VCR.

In accordance with one aspect of the present invention, there is provided a video cassette recorder incorporating therein a reel table driving device, and a supply reel and a take-up reel tables which are rotatably mounted on a deck, the reel table driving device comprising: a pulley attached to a shaft rotatably held in the deck; a driving gear slidably mounted to the shaft, the driving gear being provided with a first and a second gear portions, the first gear portion having a smaller diameter than that of the second; a pair of idlers rotatably held in a support plate, each of the idlers including a first gear and a second gear, the first gear having a larger diameter than that of the second; means for biasing the driving gear upwardly so that the first gear portion of the driving gear is engaged with the first gears of the idlers; and means for selectively pressing and moving the driving gear downwardly so that the second gear portion is engaged with the second gears of the idlers depending on an operation mode of the VCR.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
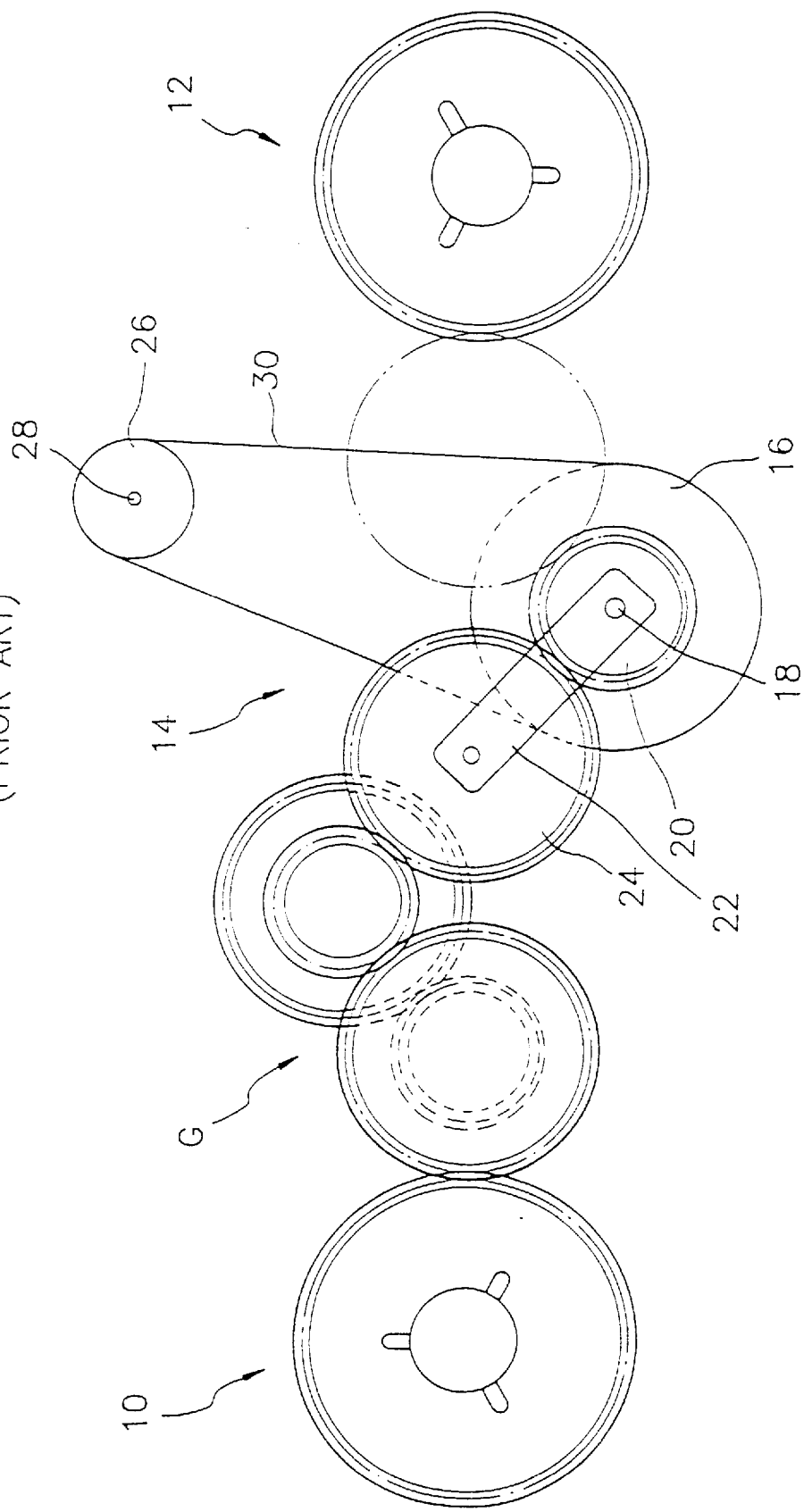
FIG. 1 shows a schematic top view of a prior art reel table driving device employed in a VCR.
Figure 2:
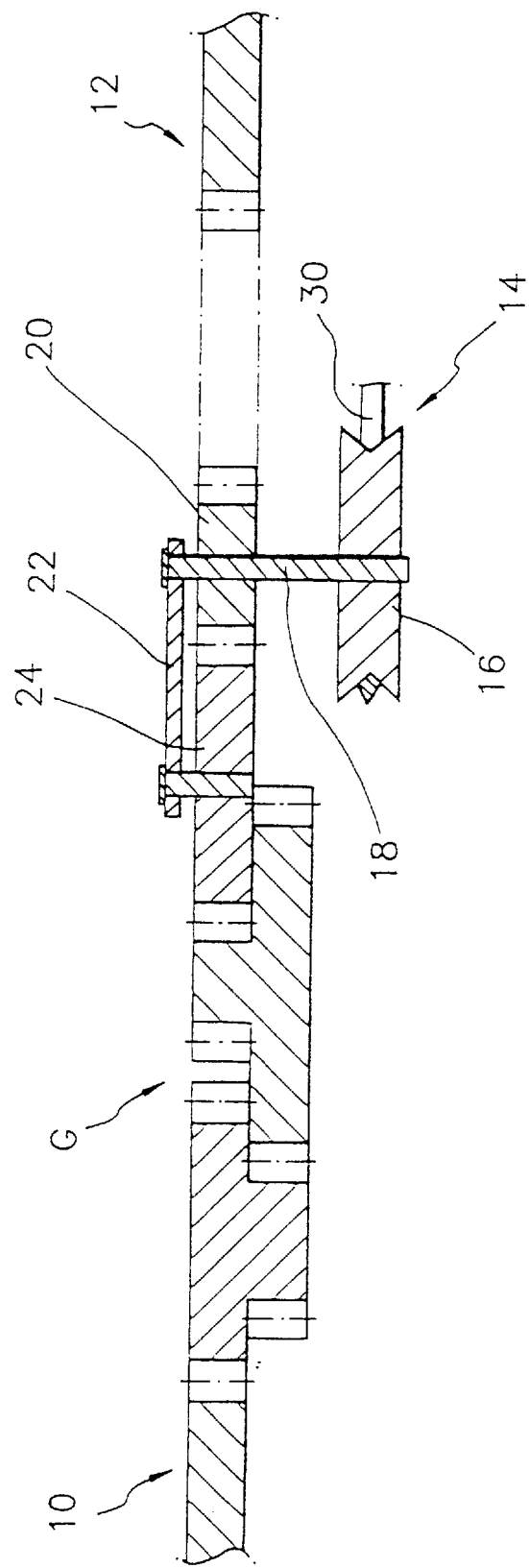
FIG. 2 illustrates a sectional view of the device in FIG. 1.
Figure 3:
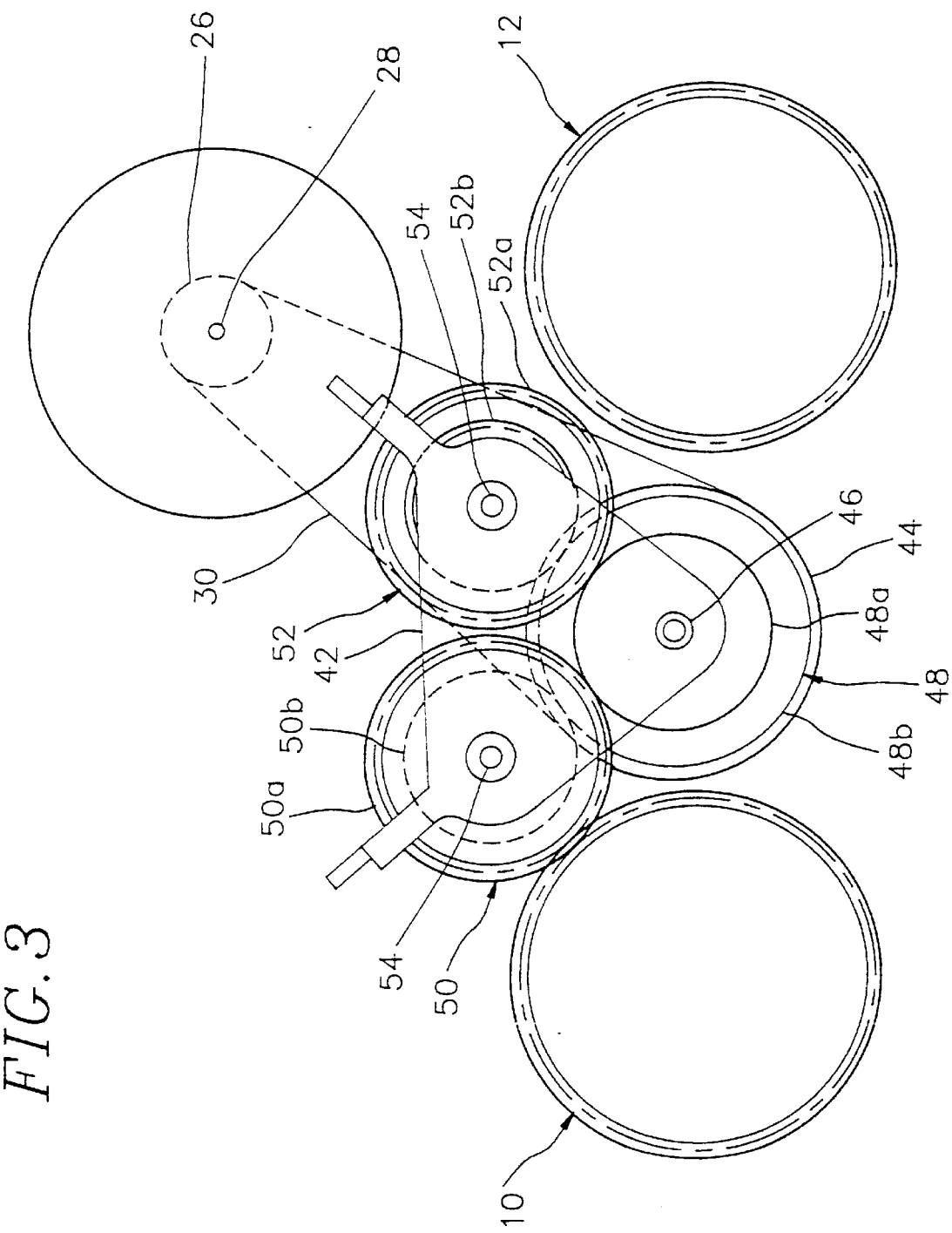
FIG. 3 depicts a schematic top view of a reel table driving device in accordance with a preferred embodiment of the present invention.
Figure 4:
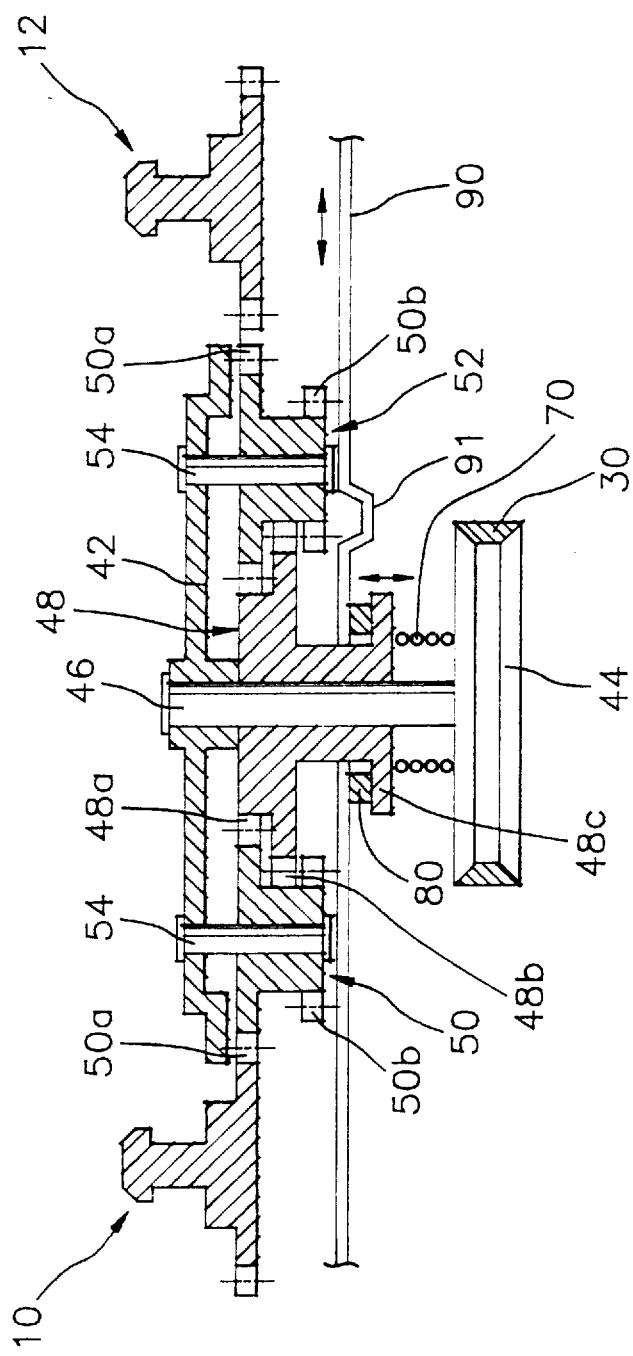
FIG. 4 presents a sectional view of the device in FIG. 3.
Figure 5:
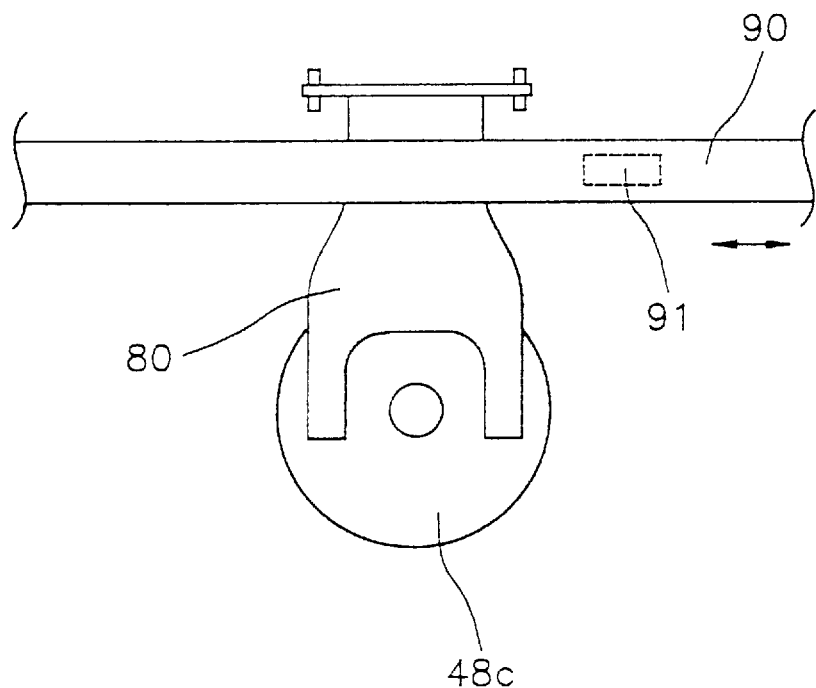
FIG. 5 represents a schematic top view of a reel table driving device in FIG. 4, showing the urging member and the movable lever.

Referring to FIGS. 3 to 5, there is shown a reel table driving device for use in a VCR in accordance with a preferred embodiment of the present invention. The reel table driving device comprises a support plate 42, a pulley 44 attached to a shaft 46 rotatably held in the support plate 42 and a deck (not shown), a driving gear 48 slidably mounted to the shaft 46, and a pair of idlers 50, 52 engaged with the driving gear 48 and rotatably supported at the support plate 42 by pins 54. The idlers 50, 52 are disposed between a supply reel table 10 and a take-up reel table 12 rotatably mounted to the deck. Further, the idler 50, 52 are arranged in a properly spaced relationship with each other so that one of them is selectively engaged with and disengaged from one of the supply reel and take-up reel tables 10, 12. In particular, the idlers 50, 52 are positioned adjacent to the reel tables 10, 12 so as to minimize their shifting motion therebetween. This can prevent a loaded tape (not shown) from slackening during the switching of the operation mode.

As best shown in FIG. 4, each of the idlers 50, 52 is provided with a set of stepped gears integrally formed therein. That is, each of the first and second idlers 50, 52 includes a first gear 50*a*, 52*a* and a second gear 50*b*, 52*b*, the first gear 50*a* having a larger diameter than the second gear 52*b*. The driving gear 48 is provided with first and second gear portions 48*a*, 48*b* and a bottom plate 48*c*, the first gear portion 48*a* having a smaller diameter than the second gear portion 48*b*. A compressive spring 70 is disposed between the bottom plate 48*c* of the driving gear and the pulley 44, biasing the driving gear upwardly so that the first gear portion 48*a* is engaged with the first gears 50*a*, 52*a* of the idlers 50, 52 during, e.g., a play or review mode.

As is well shown in FIG. 5, an urging member 80 is pivotably mounted at one end to the deck and the other end thereof is situated on the bottom plate 48*c*. A movable lever 90 with a protuberance 91 is mounted to the deck above the urging member 80, being movable in the lengthwise direction depending on the operation mode of the VCR. The protuberace 91 of the movable lever 90 presses the urging member 80 and hence the driving gear 48 down against the spring 70 during, e.g., a fast forward or rewind mode so that the second gear portion 48*b* is engaged with the second gears 50*b*, 52*b* of the idlers 50, 52. The movable lever 90 is disclosed in detail in U.S. Pat. No. 5,621,584 incorporated herein by reference.

Operation of the reel table driving device of the present invention will now be described.

In case of the play mode, the driving gear 48 rotates in the clockwise direction in FIG. 3 and the support plate 42 of the reel table driving device is quickly shifted toward the take-up reel table 12 due to the rotating force of the driving gear 48. As a result, the first gear 52*a* of the second idler 52 is engaged with the take-up reel table 12 so that the rotation of the driving gear 48 is transmitted to the take-up reel table 12 through the second idler 52. When the mode is changed to the fast forward, the movable lever 90 is moved to the left in FIG. 4 and the protuberance thereof presses the urging member 80 and hence the driving gear 48 down against the spring 70 so that the second gear portion 48*b* of the driving gear 48 is engaged with the second gear 52*b* of the second idler 52 portion. Therefore, the torque transmitted to the take-up reel table is increased so that the take-up reel table 12 rotates in a relatively high speed.

On the other hand, in the review mode, the driving gear 48 is rotated in the counterclockwise direction in FIG. 3, causing the support plate to be shifted toward the supply reel table 10 so that the first gear 50*a* of the first idler 50 is engaged with the supply reel table 10. In the rewind mode, the movable lever 90 is moved to the left in FIG. 4 and the protuberance thereof presses the urging member and hence the driving gear 48 down against the spring 70 so that the second gear portion 48*b* of the driving gear 48 is engaged with the second gear 50*b* of the first idler 50 portion. Therefore, the torque transmitted to the supply reel table is increased so that the supply reel table 10 rotates in a relatively high speed.

According to the present invention, the shifting distance of the idlers is minimized to thereby prevent the slackness of a loaded magnetic tape during the change of the operation mode. In addition, the torque transmitted to the supply and the take-up reel tables is varied depending on the operation mode.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder (VCR) incorporating therein a reel table driving device, and a supply reel table and a take-up reel table which are rotatably mounted on a deck, the reel table driving device comprising:

a pulley attached to a shaft rotatably held in the deck;

a driving gear non-rotatably coupled to and slidably mounted to the shaft, the driving gear being provided with first and second gear portions, the first gear portion having a smaller diameter than the second gear portion and being positioned above the second gear portion;

a pair of idlers rotatably held in a support plate, each of the idlers including a first gear and a second gear, the first gear having a larger diameter than the second gear and being positioned above the second gear;

means for biasing the driving gear upwardly so that the first gear portion of the driving gear is engaged with the first gears of the idlers; and means for selectively pressing and moving the driving gear downwardly so that the second gear portion is engaged with the second gears of the idlers depending on an operation mode of the VCR.

2. The recorder of claim 1, wherein the driving gear is provided with a bottom plate positioned above the pulley, the driving gear upwardly biasing means includes a compressive spring disposed between the bottom plate and the pulley, and the driving gear downwardly pressing means includes a movable lever with a protuberance structured such that when the movable lever is moving in the lengthwise direction of the lever, the protuberance selectively presses the bottom plate of the driving gear down so that the second gear portion is engaged with the second gears of the idlers depending on an operation mode of the VCR.

3. The recorder of claim 1, wherein the driving gear is provided with a bottom plate positioned above the pulley, the driving gear upwardly biasing means includes a compressive spring disposed between the bottom plate and the pulley, and the driving gear downwardly pressing means includes an urging member and a movable lever with a protuberance, the urging member being pivotably mounted at one end to the deck and the other end being situated on a top of the bottom plate of the driving gear, the movable lever is structured such that when the lever is moving in the lengthwise direction of the lever the protuberance selectively presses the urging portion and the driving gear down depending on the operation mode.

\* \* \* \* \*

UNITED STATES PATENT AND TRADEMARK OFFICE
CERTIFICATE OF CORRECTION

PATENT NO. : 5,833,162
DATED : November 10, 1998
INVENTOR(S) : Ho-Jin Jang

It is certified that error appears in the above-identified patent and that said Letters Patent is hereby corrected as shown below:

On the title page, insert

-- [30] Foreign Application Priority Data

Dec. 22, 1993  [KR]  Rep. of Korea   93-29144 --

Signed and Sealed this

Thirteenth Day of July, 1999

Attest:

Attesting Officer

Q. TODD DICKINSON

Acting Commissioner of Patents and Trademarks